United States Patent [19]

Neeleman

[11] Patent Number: 5,232,061
[45] Date of Patent: Aug. 3, 1993

[54] VIBRATION ATTENUATING DEVICE FOR A WEIGHING SCALE

[75] Inventor: Christiaan Neeleman, Zurich, Switzerland

[73] Assignee: Mettler-Toledo AG, Greifensee, Switzerland

[21] Appl. No.: 856,742

[22] Filed: Mar. 24, 1992

[30] Foreign Application Priority Data

Apr. 26, 1991 [CH] Switzerland ............... 1226/91-2

[51] Int. Cl.$^5$ .................... G01G 21/10; F16F 9/30
[52] U.S. Cl. .................... 177/184; 177/187; 177/189; 177/225; 188/268
[58] Field of Search ............. 188/268; 177/187, 189, 177/225, 184

[56] References Cited

U.S. PATENT DOCUMENTS

| | | | |
|---|---|---|---|
| 2,648,534 | 8/1953 | Mettler et al. | 177/189 |
| 2,800,321 | 7/1957 | Jarret et al. | 188/268 |
| 2,819,060 | 1/1958 | Neidhart | 188/268 |
| 3,134,585 | 5/1964 | Trask | 188/268 |
| 3,202,412 | 8/1965 | Trask | 188/268 |
| 3,952,980 | 4/1976 | von Pragenau et al. | 188/268 |
| 4,029,178 | 6/1977 | Tschift | 188/268 |
| 4,184,555 | 1/1980 | Maltby et al. | 177/189 X |
| 4,489,797 | 12/1984 | Gordon | 177/128 |
| 4,509,730 | 4/1985 | Shtarkman | 188/268 |
| 4,576,366 | 3/1986 | Gallas et al. | 188/268 |
| 4,594,521 | 6/1986 | Schlicher | 310/15 |
| 4,923,057 | 5/1990 | Carlson et al. | 188/268 |

FOREIGN PATENT DOCUMENTS

| | | |
|---|---|---|
| 0201095 | 12/1986 | European Pat. Off. . |
| 0550449 | 8/1932 | Fed. Rep. of Germany . |
| 0843610 | 7/1952 | Fed. Rep. of Germany . |
| 0661120 | 6/1987 | Switzerland . |

*Primary Examiner*—Mark J. Reinhart
*Assistant Examiner*—Randy W. Gibson
*Attorney, Agent, or Firm*—Laubscher & Laubscher

[57] ABSTRACT

A vibration attenuation device serves to damp in a two-stage manner with a non-linear spring characteristic a pair of relatively movable components, such as the weighing pan and the weighing pan carrier of a scale. First and second stage resilient compressible means extend different distances from one side of a base member for successive activation by the components as they are displaced together, thereby to produce a vibration behavior that approximates the inherent frequency of the weighing scale.

12 Claims, 4 Drawing Sheets

1

VIBRATION ATTENUATING DEVICE FOR A WEIGHING SCALE

STATEMENT OF THE INVENTION

This invention relates to a vibration attenuating device for reducing vibration between two components, such as the weighing pan and weighing pan carrier of a weighing scale, characterized by the provision of at least one pair of attenuating bodies of different axial lengths for providing two-stage attenuation, whereby a desired non-linear spring characteristic is achieved.

BRIEF DESCRIPTION OF THE PRIOR ART

Vibration attenuating devices for isolating a weighing pan from its carrier, or a scale housing from its support, are disclosed in the prior art, as evidenced, for example, by the U.S. patent to Gordon No. 4,489,797. In this known attenuating device, an attenuating element formed of resilient material is inserted in the weighing pan carrier up to a part of its total height. It contains a bore for receiving a retaining element or a load element of the scale housing.

Such an attenuation element attenuates the occurring oscillations only to a very limited degree when an object is placed on the scale dish. Besides, such an attenuation element can influence the vibration behavior of the scale with the load and the one without the load only very little because the shape offers almost no possibility for a coordination with the differing vibration behavior in these two cases. In particular, with this kind of attenuation element, one cannot achieve an inherent frequency behavior of the scale that would be almost uniform for the entire load range, as is normally desirable.

The purpose of the invention therefore is to prevent the disadvantages of the state-of-the-art devices and to create attenuation elements which, because of their structure, can be used in the most varied ways for the occurring forces and load cases of a scale. Besides, the idea is to achieve a vibration behavior of the scale that will be almost uniform for the entire load range, especially as regards the inherent frequency of the scale.

SUMMARY OF THE INVENTION

Accordingly, a primary object of the invention is to provide a vibration attenuating device for mounting between components, such as the weighing pan and weighing pan carrier of a weighing scale, characterized by the provision of a base member having at least a pair of parallel resilient compressible body members of different axial dimensions extending from one side thereof, thereby to afford a two-stage attenuating effect with a non-linear spring characteristic.

According to a further feature of the invention, additional pairs of attenuating bodies extend laterally from one or more orthogonally arranged side walls of the attenuator, the bodies of each pair having different lengths to provide the desired two-stage attenuating effect.

Another object of the invention is to provide an attenuator structure in which one of the attenuator bodies has a generally rhomboid configuration, with a plurality of second attenuator bodies of smaller length being arranged to define a column within the first body.

According to a further object, the attenuator is molded from a suitable resilient compressible rubber-like material, such as a synthetic plastic material, the pair of attenuator bodies being integral with the generally planar base member. Connecting pins may be provided for connecting the attenuator device with the scale pan carrier or similar support.

BRIEF DESCRIPTION OF THE DRAWINGS

Other objects and advantages of the invention will become apparent from a study of the following specifications when viewed in the light of the accompanying drawings, in which.

DETAILED DESCRIPTION

Figure 1:
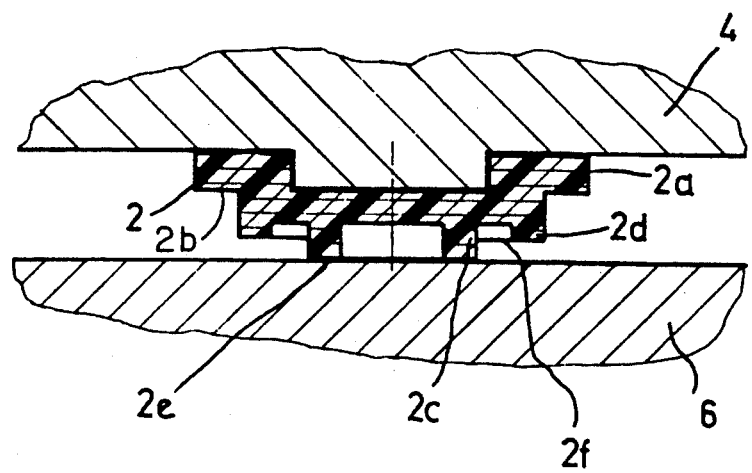
FIG. 1, is a cross-sectional view of a first embodiment of the invention.

Referring first more particularly to FIG. 1, the attenuating element 2 is adapted to be arranged between a pair of components, such as a weighing pan 4 and a weighing pan carrier 6 of a conventional weighing scale.

The attenuating body includes a base portion 2a having an annular surface 2b adapted for engagement by the corresponding face of the weighing pan. Integrally formed with the base plate portion 2a are a pair of concentrically spaced annular attenuating portions 2c and 2d, the actual axial dimension of the inner annular portion 2c being greater than that of the outer annular portion 2d. The annular portion 2c has an end face 2e that is arranged to engage the corresponding face of the weighing pan carrier 6. The end faces 2e and 2f of the annular projections 2c and 2d, respectively, are flat and parallel with the end face 2b of the base portion 2a. The attenuator member 2 is formed of a compressible resilient rubber like material, such as a suitable synthetic plastic material. If desired, the attenuator material may be electrically conductive. Owing to the difference in height, (i.e. axial dimensions), of the inner and outer annular portions 2c and 2d, respectively, a two-stage attenuating effect is produced as the scale components 4 and 6 are progressively displaced together, thereby to compress the attenuating member 2 axially with a non-linear spring characteristic. Thus, initially the projection 2c is compressed until the end face 2f of the second annular portion 2d is engaged by the corresponding surface of the pan carrier 6, whereupon further movement of the scale components together effects compression of both the annular portion 2c and the annular portion 2d. Thus, two attenuation bodies 2c and 2d are defined in the form of concentrically arranged annular cylindrical or prismatic elements, whereby the different axial dimensions correspond with the differing load steps or loads on the weighing scale.

Figure 3:
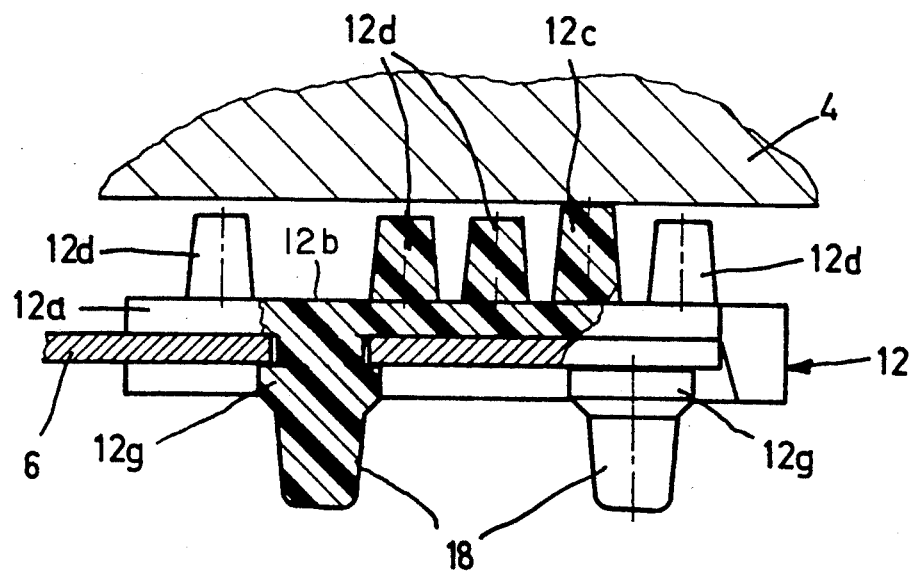
FIGS. 2 and 3 are top plan and front elevational views, respectively, of a second embodiment of the invention.
Figure 2:
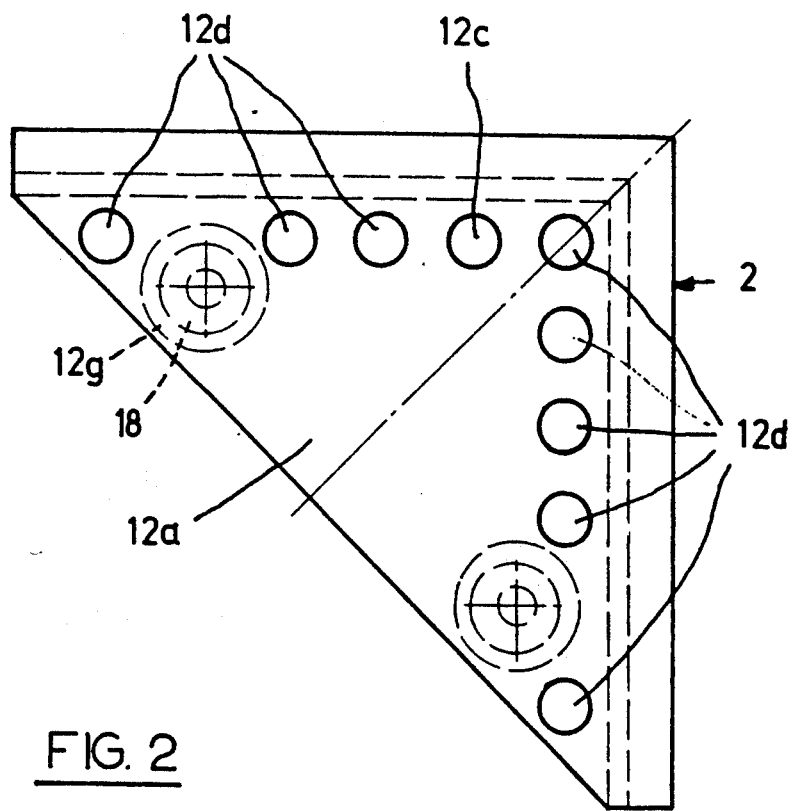

Referring now to the embodiment of FIGS. 2 and 3, in this embodiment the base plate portion 12a of the attenuating member 12 includes a first compressible resilient attenuating portion 12c, and a plurality of second compressible resilient attenuating body portions 12d, the axial dimensions of the first body portion 12c relative to the flat face 12b of the base portion being greater than the corresponding axial dimension of the second body portions 12d. In this embodiment, the base plate 12a has a generally triangular configuration, with the resilient compressible body portions 12c and 12d extending upwardly from one side of the base plate portion 12a. These body portions have the configuration in FIG. 3 of truncated conical members, but it is apparent that these body portions could have a cylindrical or other cross-sectional configuration, as well. Extending downwardly from the base plate portion 12a are a pair of clamping portions 12g to which are connected connecting pins 18, respectively. The various portions of the attenuating body 12 are formed, by molding for example, as an integral structure from a suitable compressible rubber-like material, such as a suitable synthetic plastic material. In this embodiment, the attenuating body portions 12c and 12d are of different height (i.e., of a different axial dimension), whereby the differing heights correspond with the different load steps of the two-stage attenuating operation that is produced as the weighing scale components 4 and 6 are displaced together.

Figure 5:
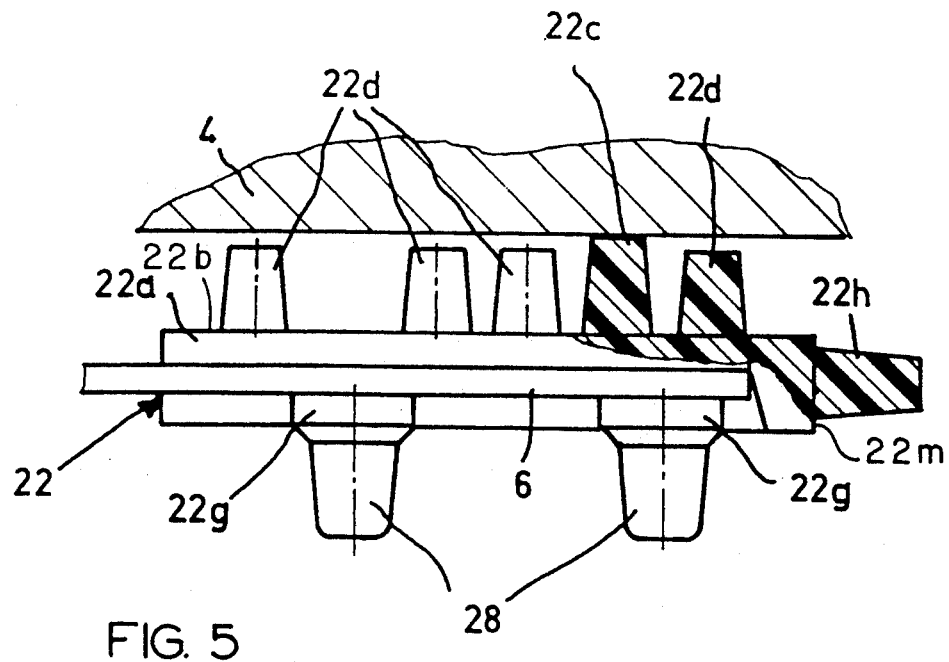
FIGS. 4 and 5 are top plan and front elevational views, respectively, of a third embodiment.
Figure 4:
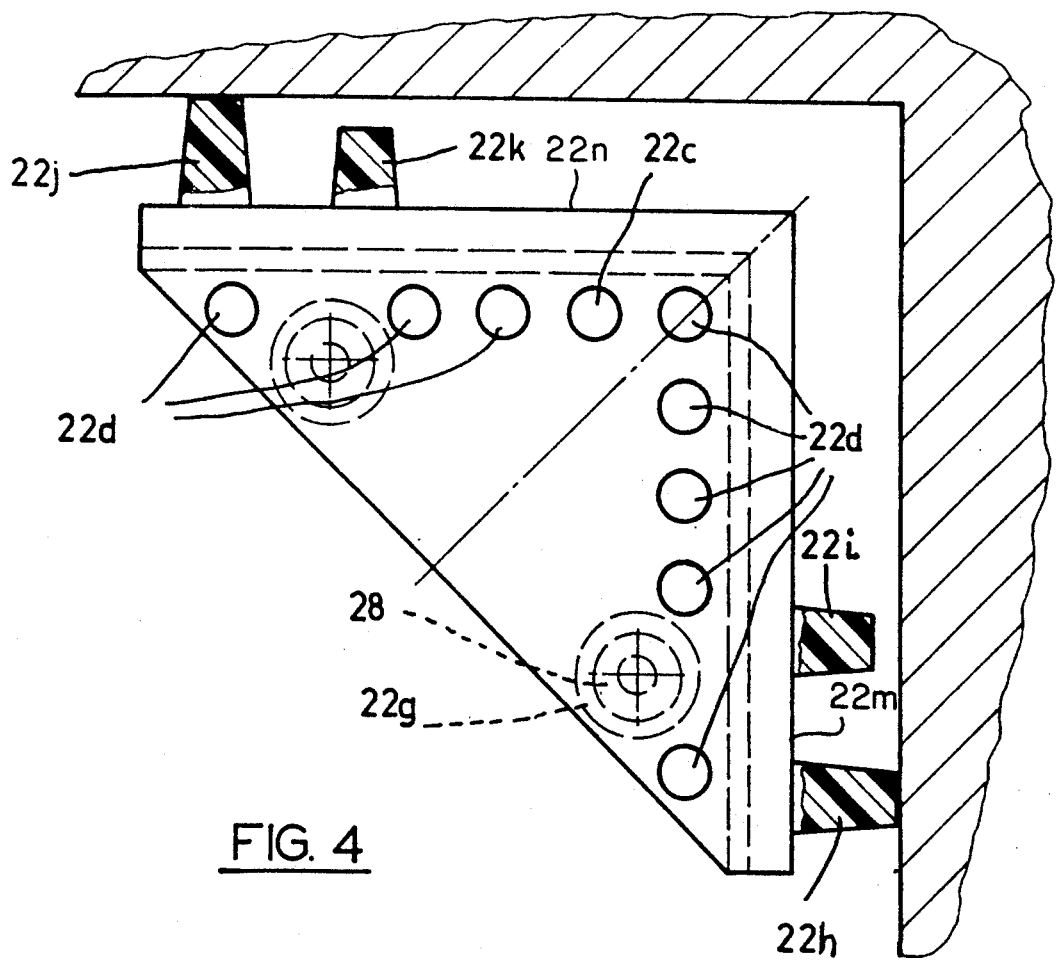

Referring now to the embodiment of FIGS. 4 and 5, in addition to the first body attenuating portions 22c and 22d extending vertically upwardly from the upper face 22b of the base plate portion 22a, the attenuating body member is provided with laterally extending body portions 22h and 22i that extend laterally from one side surface 22n of the attenuating body base portion 22a, and second pairs of body portions 22j and 22k that extend laterally outwardly from an orthogonally arranged sidewall 22n of the attenuating member 22, the axial lengths of the body members 22h and 22j being greater than the corresponding body members 22i and 22k, respectively, thereby to effect in each case the desired two-step attenuating operation with non-linear spring characteristics during successive compression of the pairs of body members, respectively. Thus, the laterally extending projections 22h and 22i and 22j and 22k, respectively, are adapted to engage corresponding side surfaces of the weighing scale housing. These attenuation bodies can have the configurations of cylinders, truncated cones, truncated pyramids, prisms, or a combination of the same.

Figure 7:
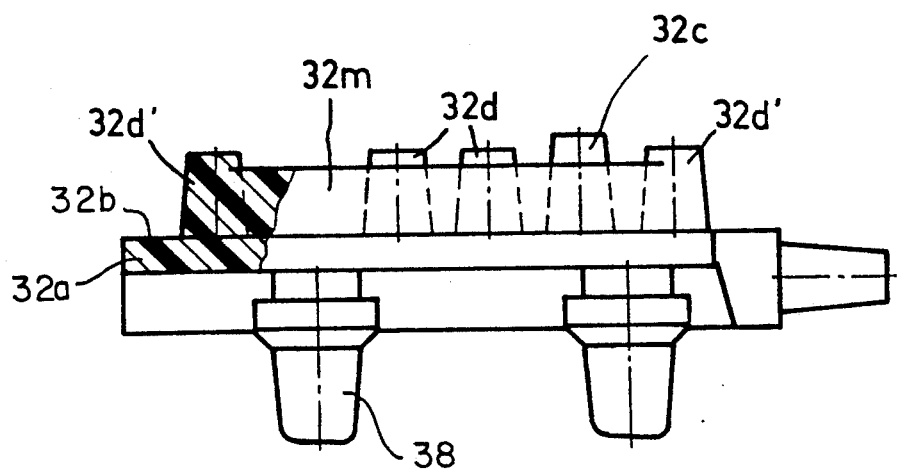
FIGS. 6 and 7 are top plan and front elevational views, respectively, of a fourth embodiment.
Figure 6:
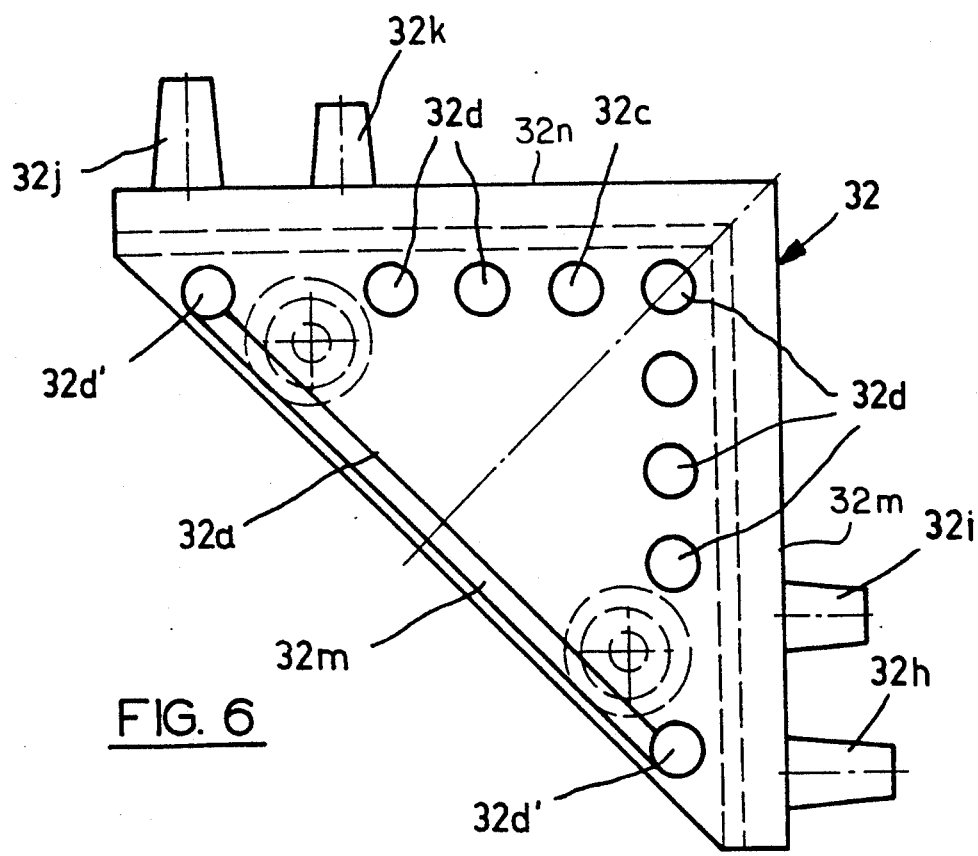

Referring now to FIGS. 6 and 7, the projecting bodies attenuating are reinforced by providing a reinforcing bar 32m that is formed integrally with, and extends between, a pair of the resilient compressible attenuating body members 32d'. Thus, the reinforcing bar portion 32m provides the attenuating body portions 32d' with more stability, especially against forces acting obliquely thereon.

Figure 8:
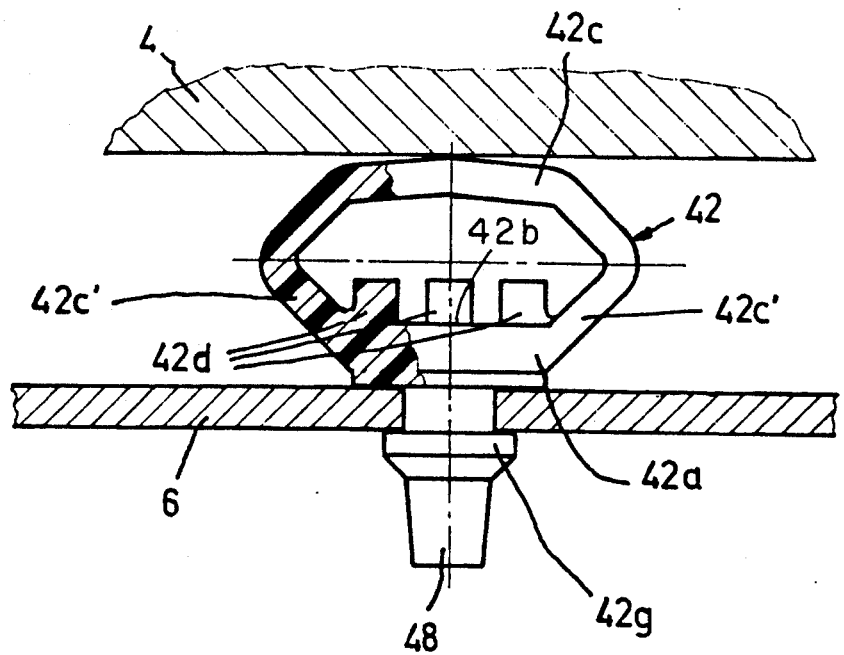
FIG. 8 is a front elevational view of a fifth embodiment.

Referring now to FIG. 8, in this embodiment, the base plate portion 42a is provided with a U-shaped generally rhomboidal first attenuating body portion 42c having a pair of leg portions 42c' the free ends of which are connected with the base plate portion 42a, and a plurality of shorter resilient compressible attenuating body portions 42d projecting upwardly from the base plate portion, 42a within the space defined within the first attenuating body portion 42c. Thus, the base plate portion 42a and the first and second attenuating bodies 42c, 42d, 42g and 48 are integrally molded from a suitable resilient compressible material, such as a rubber-like synthetic plastic material. Thus, the attenuating body portions 42c and 42d are arranged for first and second stage operation during axial compression of the attenuator device. Here, the force transmission takes place from the housing of the weighing apparatus to the support or from a weighing pan to a weighing pan carrier in a first loading step by a first attenuating body portion 42c, whereby upon further compression of the attenuating member, the second resilient compressible attenuating body members 42d come into play. These body members 42d could have the form of cylinders, truncated cones, truncated pyramids, prisms or the like, and they all have the same height, thereby functioning as columnar bodies. The attenuating body member has a clamping portion 42g that sits on, or is preferably integral with or adhesively bonded to, the mounting pin member 48.

The attenuation bodies with the first shape (prism or cone shape) can be provided concentrically with respect to each other, next to each other, or also by way of a mixture of these two arrangement possibilities. The essential thing here is to make sure that the attenuation bodies of the second kind, have a lesser height than the attenuation bodies of the first kind. In this way, one can ensure the gradual load pickup by the vibration attenuation element when the scale dish is loaded. This causes a graduated change in the vibration behavior of the scale.

Moreover, the attenuation bodies of the first and second kind, or the vibration attenuation element can be provided in a flexible-resilient manner on a scale pan carrier, laterally with respect to their axis for floating suspension bearing from the scale housing opposite the support of a scale pan. Furthermore, the vibration attenuation element can be made of electrically conducting and simultaneously rubber-like resilient material.

The vibration attenuation element can also include, on its base plate portion attenuation bodies that are arranged in different planar directions, especially those directions that are perpendicular to each other, and can thus be made to rest against other surfaces of a scale dish or a support of the scale.

It is naturally also possible to make the attenuation bodies in three or more steps with different heights, whereby one can achieve an even more differentiated adaptation to the load conditions or to the inherent oscillation behavior of the scale. It is also possible to make the attenuation bodies of the first or second kind, each, with a non-linear spring characteristic; through cooperation with the shaping of attenuation bodies, this facilitates an even finer gradation of the vibration behavior of the scale. Such a nonlinear spring characteristic can, as described above, be made in terms of design or by means of the selection of the material. For example, rubber reveals a generally nonlinear spring characteristic. In particular, by means of a suitable combination of shape and material, one can achieve an even more essential improvement in the adaptation to the desired vibration behavior of the scale in the various loading situations.

This kind of multistep attenuation element according to the invention determines not only the vibration behavior but also improves the behavior with respect to blows against the scale and renders such blows extensively ineffective as far as the weighing accuracy is concerned.

A two-step attenuation element can, in one of the possible variants, in its first, higher step, absorb the normal load of the weighing range and, in the second, lower step, the excess load. In this way, one can make sure that the first step will not be worn out or damaged in case of overload.

The columnar attenuation bodies offer the advantage that they are easily adapted to different scale types, that is to say, to their differing vibration or inherent oscillation behaviors.

In a further practical version of all attenuation bodies of the first and second kind, they can, along the free front surfaces along which they come into contact with a third object, for example, the adjusting surface of a scale, etc., be made bomb-shaped.

The variant with the rhombus shape of the attenuation body of the first kind, with the second shape, offers the essential advantage that one can achieve an even better separation of the two-step arrangement in that the point of the overload, at which the attenuation bodies of the second kind are to swing into action, can be fixed very precisely.

While in accordance with the Patent Statutes, the preferred forms and embodiments have been illustrated and described, various modifications may be made without deviating from the inventive concepts set forth above. Thus, while the preferred embodiments have been illustrated as being integral attenuation elements, it is apparent that they could likewise be assembled from individual components.

What is claimed is:

1. A vibration attenuating device for dampening the vibrations between a pair of components of a weighing scale, comprising:
    (a) a body member (2; 12; 22; 32; 42) adapted for arrangement between said components, said body member including a base portion (2a; 12a; 22a; 32a; 42a) spaced from one of said components;
    (b) at least one first resilient compressible attenuating portion (2c; 12c; 22c; 32c; 42c) integral with said base portion and extending toward said one component; and
    (c) at least one second resilient compressible attenuating portion (2d; 12c; 22d; 32d; 42d) integral with said base portion and extending toward said one component;
    (d) said first attenuating portion having a greater effective dimension in the direction of said one component relative to said base portion than said second attenuating portion, whereby upon progressive displacement of said components toward each other, only said first attenuating portion is compressed, and upon further displacement of said components toward each other, both of said first and second attenuating portions are compressed, thereby to afford a nonlinear spring characteristic for dampening the vibrations between said components.

2. Vibration attenuating means for dampening the vibrational forces between a pair of relatively movable scale components, comprising:
    (a) a body member (2; 12; 22; 32; 42) adapted for arrangement between said components, said body member including a base portion (2a, 12a; 22a; 32a; 42a) having a first face (2b; 12b; 22b; 32b; 42b) spaced from and generally parallel with the adjacent face of one of said components;
    (b) at least one resilient compressible first-stage attenuating portion (2c; 12c; 22c; 32c; 42c) integral with said base portion and extending from said first face toward said one component;
    (c) at least one resilient compressible second-stage attenuating portion (2d; 12d; 22d; 32d; 42d) integral with said base portion and extending from said first face toward said one component;
    (d) the effective length of said first attenuating portion relative to said first face being greater than the effective length of said second attenuating portion, thereby to define a first pair of compressible attenuating portions operable to afford a two-stage attenuating effect with a non-linear spring characteristic as said scale components are progressively displaced toward each other.

3. Vibration attenuating means as defined in claim 2, wherein said body member base portion includes a second face (22 m) normal to said first face;
    (e) and further including at least a second pair (22h, 22i) of said first and second stage attenuating portions extending from said second face toward a corresponding face of said one component.

4. Vibration attenuating apparatus as defined in claim 3, wherein said body member base portion includes a third face (22n) normal to both said first and second faces;
    (f) and further including at least a third pair (22j, 22k) of said attenuating portions extending from said third face toward a corresponding surface on said one component.

5. Apparatus as defined in claim 2, wherein said first-stage resilient compressible portion has a hollow generally U-shaped rhomboid configuration defining a pair of spaced leg portions connected at one end with said base member, respectively, said second-stage resilient compressible portion being arranged between said leg portions of said first-stage resilient compressible portion.

6. Apparatus as defined in claim 2, wherein said second-stage resilient compressible portion is annular and is arranged in concentrically spaced relation about said first-stage resilient compressible portion.

7. Apparatus as defined in claim 2, wherein said first and second-stage resilient compressible portions comprise generally cylindrical attenuator bodies that extend from said base portion in adjacent spaced generally parallel relation.

8. Apparatus as defined in claim 7, wherein said attenuator bodies are each in the form of a truncated cone.

9. Apparatus as defined in claim 7, and further including reinforcing means for connecting together at least a pair of said compressible body portions.

10. Apparatus as defined in claim 2, wherein said first-stage and second-stage resilient compressible portions and said base portion are formed by molding from a resilient compressible rubber-like synthetic plastic material.

11. Apparatus as defined in claim 10, wherein said material is electrically conductive.

12. Apparatus as defined in claim 2, and further including connecting pin means (18, 28, 38, 48) extending from the side of said base portion opposite said first and second stage attenuating portions for connecting said body member to one of said scale components.

* * * * *